United States Patent
Duffy

[15] 3,667,346
[45] June 6, 1972

[54] FLUID CONTROL VALVE FOR A HYDROSTATIC POWER BOOSTING MECHANISM FOR AN AUTOMOTIVE STEERING GEAR

[72] Inventor: James J. Duffy, Livonia, Mich.
[73] Assignee: Ford Motor Company, Dearborn, Mich.
[22] Filed: Oct. 29, 1970
[21] Appl. No.: 85,013

[52] U.S. Cl. ..................................91/375 A, 91/462, 91/469
[51] Int. Cl. ............................................................F15b 9/10
[58] Field of Search..........................91/375 A, 375, 462, 469

[56] References Cited

UNITED STATES PATENTS 3,408,900  11/1968  Tomita................................91/375 A

FOREIGN PATENTS OR APPLICATIONS 975,518  11/1964  Great Britain..........................91/375

Primary Examiner—Paul E. Maslousky
Attorney—John R. Faulkner and Donald J. Harrington

[57] ABSTRACT

A power boosting mechanism for an automotive vehicle steering gear comprising a pressure operated piston connected mechanically to a steering member for the dirigible wheels of an automotive vehicle, pressure passages extending to opposed sides of said piston, a steering shaft, a ball valve assembly situated in each passage including a ball valve element and a surrounding valve seat in fluid communication with said passage, an outlet flow controlling valve seat formed in said piston, means carried by the steering shaft for shifting said ball valve elements into and out of registry with the respective valve seats during application of steering effort to said steering shaft thereby controlling pressure distribution to said opposed sides of said piston.

7 Claims, 6 Drawing Figures

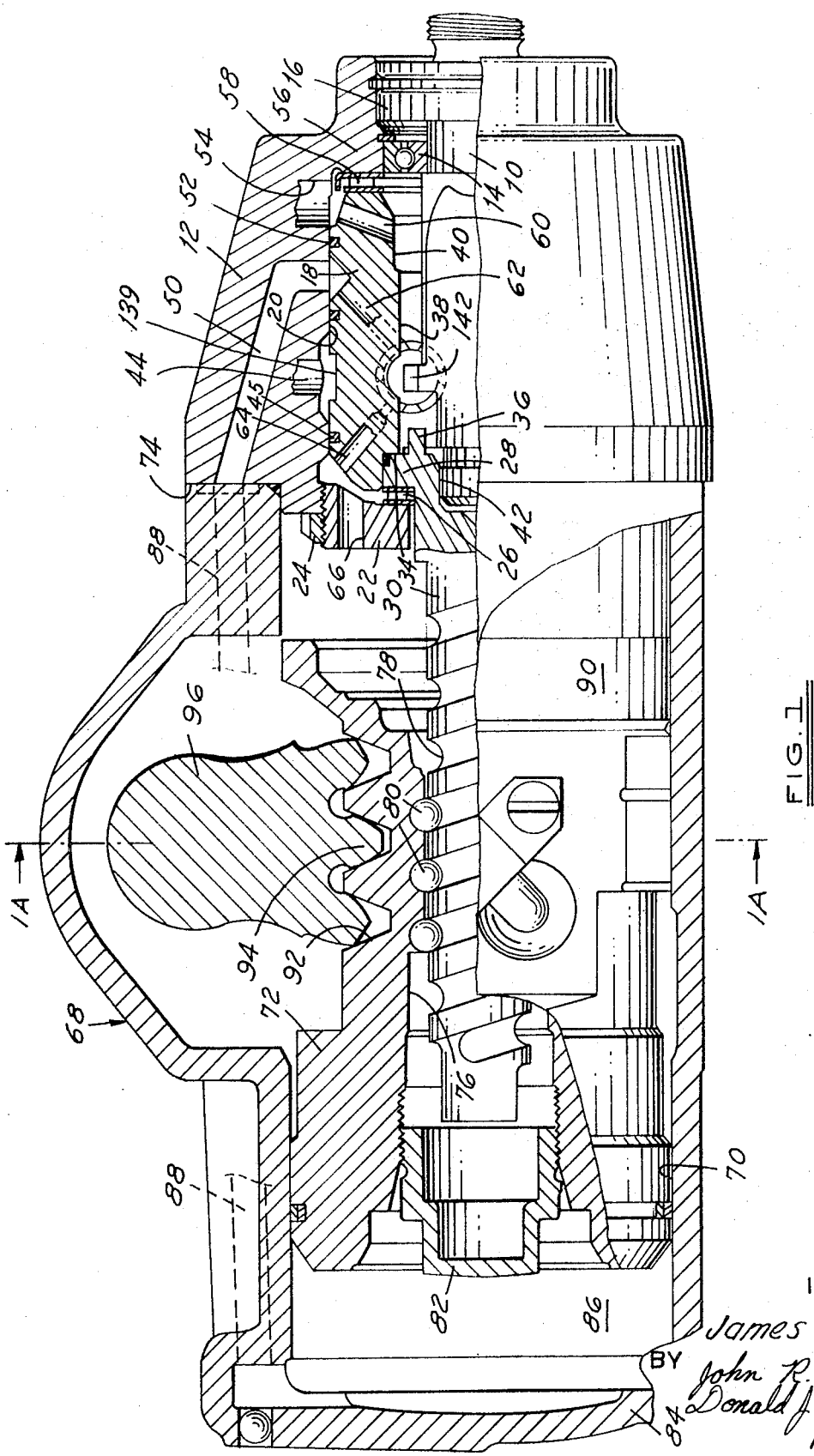

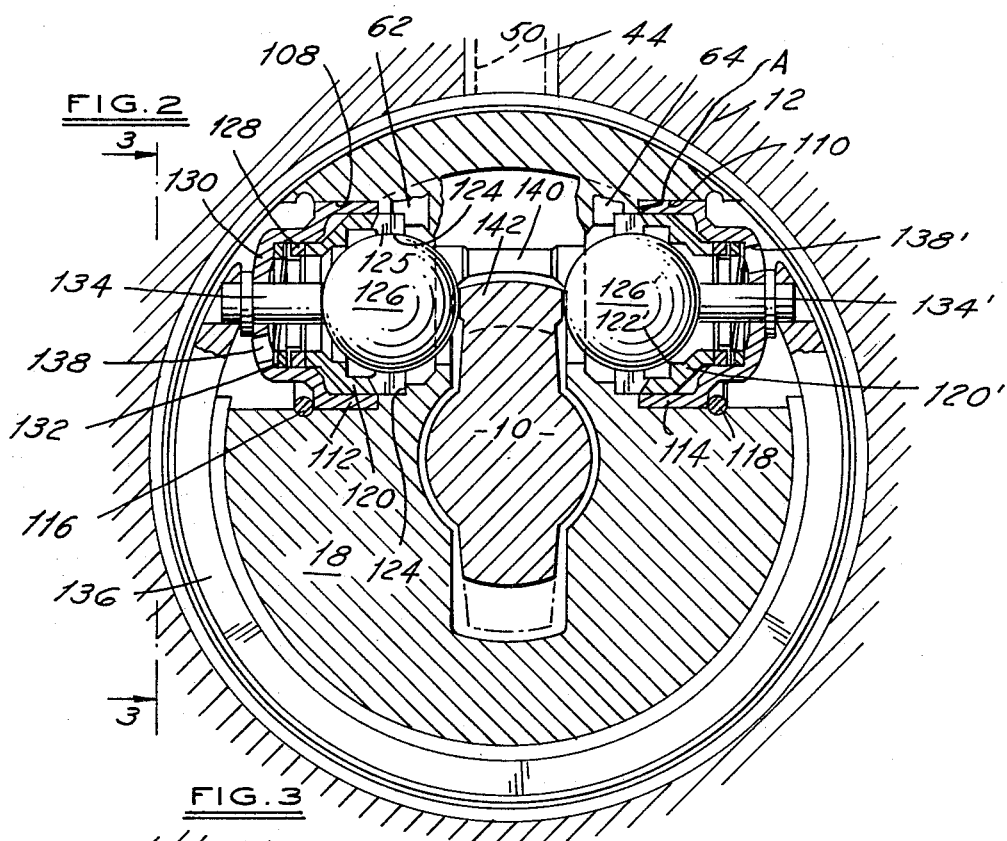
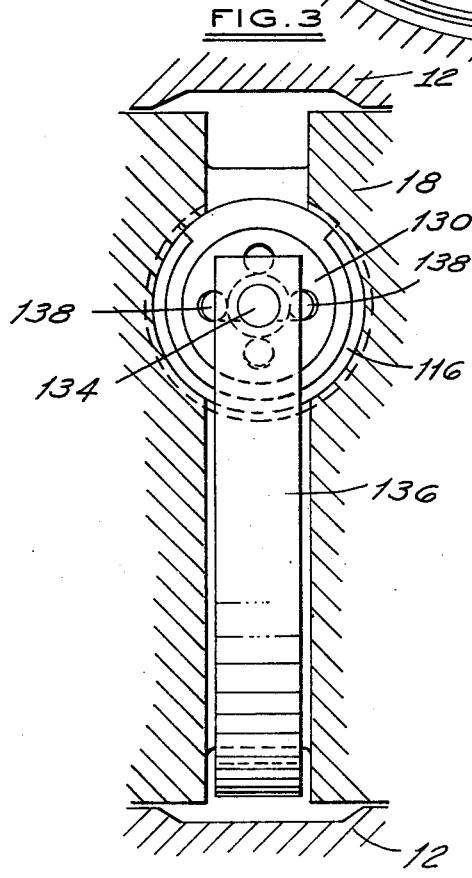

FLUID CONTROL VALVE FOR A HYDROSTATIC POWER BOOSTING MECHANISM FOR AN AUTOMOTIVE STEERING GEAR

GENERAL DESCRIPTION OF THE INVENTION

My invention relates to improvements in power steering gears for automotive vehicle steering systems. It forms a torque transmitting connection between a driver operated steering shaft and the dirigible wheels of the vehicle. A fluid pressure operated motor supplements the driver steering effort. The amount of power assist provided by the motor is determined by the magnitude of the pressure differential acting on a pressure operated member of the motor. The pressure differential in turn is controlled by the improved ball valve mechanism of my invention.

My improved power steering gear mechanism includes portions that are common to well-known power steering systems. The common elements include a fluid pressure cylinder, a movable piston mounted for reciprocating motion in said cylinder, a driven gear having teeth in engagement with teeth formed on or carried by the piston, the driven gear being mounted for oscillation in a direction transverse to the direction of motion of the piston, and a mechanical connection between the driven gear and the dirigible wheel steering linkage elements. A steering shaft under the control of a vehicle operator is connected mechanically to the piston by means of a relatively friction-free connection.

The ball valve mechanisms which comprise the improvements of my invention are situated in the pressure passages that communicate with each of the two fluid pressure chambers of the fluid motor. When one chamber is pressurized and the other is exhausted, a steering effort in one direction is induced. The opposite chambers are pressurized and exhausted as a steering effort is induced in the other direction. Each valve mechanism includes a ball valve element movably mounted within a valve sleeve which defines an inlet valve port. The ball valve element registers with the valve port to provide an inlet fluid flow path when the ball valve element is urged in one direction. The ball valve element and the surrounding sleeve are situated directly adjacent an outlet port and a cooperating valve seat formed in the valve body, the latter being mounted within a valve housing which may be secured to the previously described cylinder.

The driver operated steering shaft carries a valve actuator which is situated directly between the two ball valve elements. Preloaded spring means normally urge the ball valve elements into continuous engagement with the actuator thereby providing a resistance to movement of the ball valve elements during steering maneuvers. This provides the operator with a so-called steering feel which is proportional in magnitude to the deflection of the spring means, which in turn is proportional to the steering effort applied in the steering shaft. The driver thus can maintain a sense of control over the vehicle during turning maneuvers.

The inlet ports are subjected to pressure supplied by the pressure source. This pressure establishes a hydrostatic force on each of the ball valve elements, the force of one ball valve element being directly opposed and balancing the corresponding force on the other ball valve element. Thus the forces applied to the steering shaft are balanced, and the driver does not sense any resistance due to hydrostatic forces acting on the valve system.

The ball valve elements are moved into and out of registry with their respective valve seats as a turning effort is applied to the steering shaft. As the inlet valve seat for one valve element is closed, the inlet valve seat for the other valve element is opened. Simultaneously, the outlet valve seat for the one valve element opens as the outlet valve seat for the other valve element closes. If a steering effort is applied in the opposite direction, the converse valve operating sequence occurs.

When the steering effort is relieved from the steering shaft, a normal tendency exists for the steering shaft to assume a self-centering position. This is done under the influence of the hydrostatic forces acting on the opposed valve structures.

BRIEF DESCRIPTION OF THE FIGURES OF THE DRAWINGS

FIG. 1 shows in longitudinal cross-sectional form a power steering gear embodying the improved valve mechanism of my invention.

FIG. 2 is a cross-sectional view taken along the plane of section line 2—2 of FIG. 1.

FIG. 3 is a side elevation view as seen from the plane of section line 3—3 of FIG. 2.

PARTICULAR DESCRIPTION OF THE INVENTION

Figure 1A:
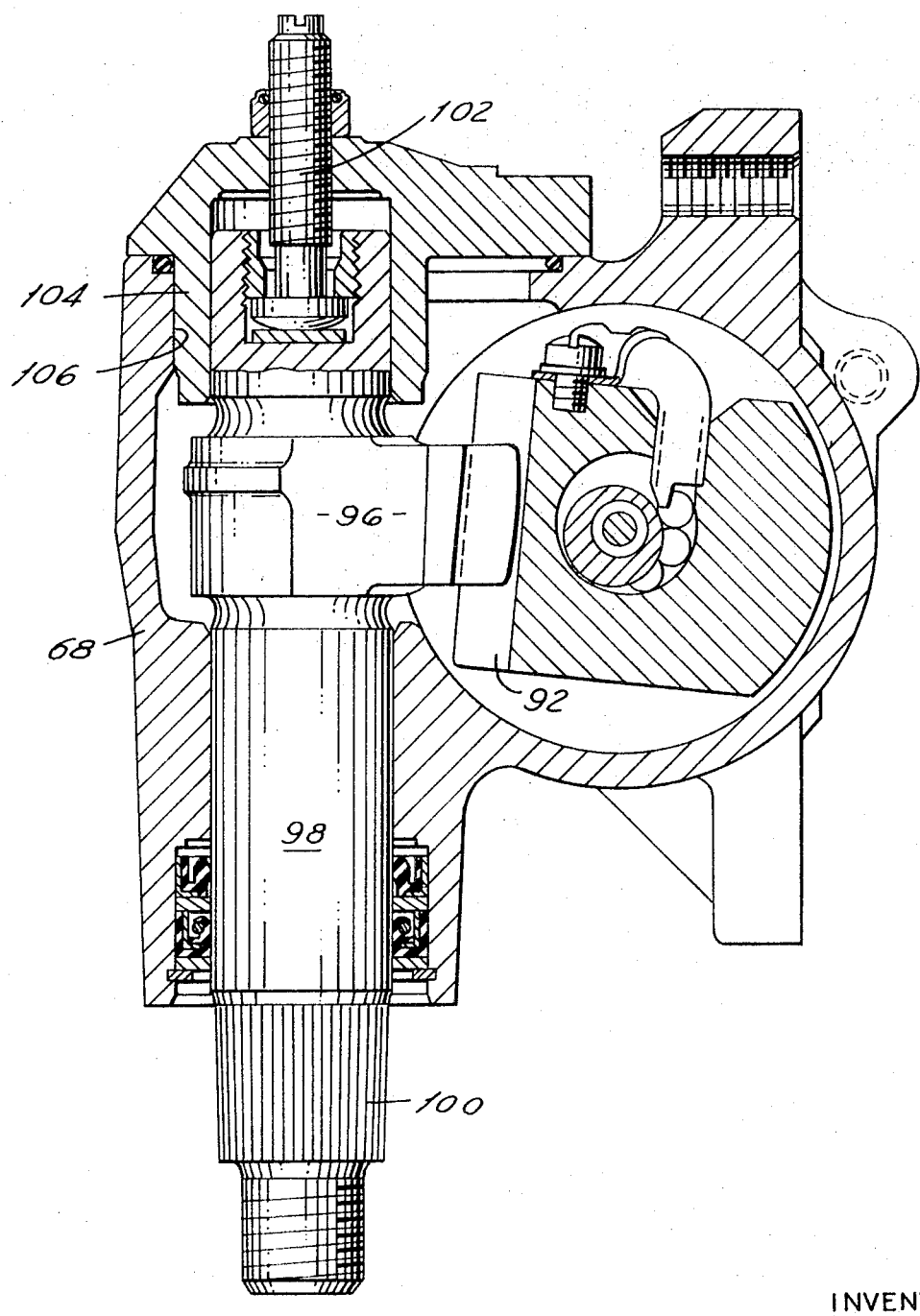
FIG. 1A is a cross-sectional view taken along section line 1A—1A of FIG. 1.

Numeral 10 designates a steering shaft which serves as a torque input shaft for the steering gear mechanism. It is connected to a vehicle steering wheel located within the vehicle passenger compartment. Shaft 10 is positioned within a valve chamber located in valve body 12. It is journalled by means of a ball bearing 14. A fluid seal 16 surrounds the shaft 10. Shaft 10 extends within valve body 18 mounted rotatably within chamber 20 formed in the valve body 12. A reaction shoulder 22 is formed within a threaded opening formed in one end of the chamber 20. A lock nut 24 and thrust washer 26 are situated between the reaction ring 22 and shoulder 28 formed on worm gear shaft 30. Shoulder 28 engages shoulder 32 formed at one end of the valve body 18. Worm shaft 30 has lugs 36 which engage internal slots 38 formed in the interior of the valve body 18, the latter surrounding the shaft 10. A central opening 40 is formed in the valve body 18 for accommodating the shaft 10. The left hand end of the shaft 10 is piloted within a pilot opening 42 formed on the right hand end of the worm shaft 30.

Valve housing 12 is ported to permit fluid pressure distribution to and from the valve structure. The porting includes an inlet port 44 which intersects the valve chamber 20 at a location intermediate seal rings 46 and 48 which surround the valve body 18. A right turn pressure port 50 intersects the valve chamber 20 at a location intermediate seal ring 48 and seal ring 52 for the valve body. An exhaust port 54 in the valve housing 12 communicates with the low pressure flow return passage for a power steering pump not shown. Part 54 is located between the seal ring 52 and the end wall 56 of the housing 12. A thrust bearing 58 is situated between the valve housing 18 and the wall 56 as indicated. Valve body 18 is ported at 60 to provide communication between the port 54 and the interior of the valve body 18.

A right turn pressure passage 62 provides communication between the valve elements and the port 50. The valve elements will be described with reference to FIG. 2. A left turn pressure passage 64 provides communication between the valve elements and left side of the valve body 18 which communicates with the pressure movable members of the mechanism through ports 66 formed in the reaction ring 22.

A valve housing 12 is secured to gear housing 68. This housing defines a cylinder 70 within which is positioned a double acting piston 72. The right hand end of the housing 68 and the left hand end of the valve housing 12 have cooperating shoulders, as shown at 74, which permit a bolted connection between the two housings. The axis of the cylinder 70 coincides with the axis of the shaft 10 and the worm shaft 30.

Shaft 30 extends within a central opening 76 formed on the piston 72. Worm shaft 30 is provided with external helical threads 78 which register with cooperating internal threads formed in the opening 76. Recirculating balls 80 surround the shaft 30.

The helical grooves and the recirculating balls 80 form a relatively friction-free threaded connection between the shaft 30 and the piston 72. Such recirculating ball and nut connections are well-known in the art. An example can be seen U.S. Pat. No. 2,159,225, issued May 23, 1939.

The central opening 76 in the piston 72 is closed at the left hand end by a closure member 82. The piston 72 cooperates with the end wall 84 of the cylinder 70 to define a first pressure chamber 86. This chamber is in fluid communication with passage 62 through a crossover passage 88 formed in housing 68 and in housing 12.

The right hand side of the piston 72 is subjected to the hydrostatic pressure that exists in chamber 90. Chamber 90 is in fluid communication with passage 64 through crossover passage 66.

The central portion of the piston 72 is formed with rack teeth 92. These engage teeth 94 of a sector gear 96. A sector gear shaft 98 extends outwardly from the housing 68 as indicated best in FIG. 1A. Shaft 98 is provided with a splined portion 100 to facilitate a driving connection with a driven member of the vehicle steering system. An antibacklash adjustment screw 102 is threadably received in closure member 104 located in end opening 106 adjacent the other end of the shaft 98. By appropriately adjusting the screw 102, the clearance between the teeth in sector gear 96 and the teeth of the rack 92 can be substantially eliminated.

The valve body 18 has a pair of oppositely disposed valve openings 108 and 110. Each valve opening receives a valve retainer of generally cupped shape as indicated at 112 and 114. The retainers 112 and 114 are held in place by snap rings 116 and 118, respectively.

Slidably positioned in valve retainer 112 is a movable valve member 120. It is formed with a circular inlet valve seat 122. Member 120 includes a circular pilot surface 124 within which is positioned a valve ball element 126. Element 126 is adapted to register with valve seat 122 when it is shifted in a left hand direction as viewed in FIG. 2.

The seal ring 128 is positioned between the left end of the member 120 and the base 130 of the retainer 112. A spring 132 is situated between the seal 128 and the base 130 thereby tending normally to urge the seat 132 into engagement with the element 126.

Movement of the member 120 in a right hand direction as viewed in FIG. 2 is limited by a stop 134. The margin of the member 120 is slotted to permit passage of pressurized fluid from the passage defined by the valve seat 122 to the pressure passage 62 around the valve element 126. A valve stem 134 is seated in the valve member 112 and is adapted to engage the valve element 126. A C-spring 136 engages the outwardly extending end of the stem 134 and urges it normally towards the ball valve element 126 thereby unseating the element 126.

A pressure inlet port 138 communicates with an external groove 139 formed in the valve body 18 which in turn communicates with the inlet pressure passage 44.

A second valve assembly situated in juxtaposition with respect to the valve assembly formed in part by valve 126 is shown in FIG. 2. This valve assembly is identical to the earlier-described valve assembly and the elements thereof have been identified with reference characters similar to the characters previously used although prime notations are added. The other end of the C-spring 136 engages a stem 134' and normally urges that stem into engagement with valve element 126', thereby unseating the valve element 126' from the valve seat 122'. This provides a through passage from inlet port 138' to the left turn pressure passage 64.

The region 140 between the ball valve elements 126 and 126' communicates through the adjacent outlet port in valve body 18 with the central opening 40 in the valve body 18. This is in fluid communication with exhaust passage 60.

Shaft 10 is provided with a valve actuator arm 142 which is disposed between the two ball valve elements 126 and 126'. When the steering gear mechanism assumes a normal straight ahead driving condition, both ball valve elements engage the arm 142 as the latter is centrally positioned with respect to each valve seat.

The diameter of the seal rings 128 and 128' is slightly larger than the diameter of the respective valve seats 122 and 122' respectively. This causes a pressure force to be maintained from the valve member 120 tending to urge it toward a valve closing position. The pressure force acting on one valve member is opposed and balanced by the pressure force acting on the other so that a balanced condition is achieved. Thus, there are no unbalanced pressure forces acting on the steering shaft 10. The driver experiences a so-called steering feel, however, by reason of the C-spring 136. Movement of the valve elements 126 and 126' toward the respective valve seats can be done only if the C-spring is deflected. The C-spring is provided with the predetermined preload which must be overcome before either valve element can be actuated.

When the valve structure is in an "on-center" condition, which exists during straight ahead driving of the vehicle, all four valve ports are opened and oil flows through each valve assembly by way of the ports 138 and 138'. The fluid circulates around the balls and through the slots 125 and 125' to the exhaust region shown in part at 140. The pressure that exists at that time in chamber 86 equals and balances the pressure in chamber 90. If the valve element 126 is shifted by the steering shaft in a left hand direction, the opening provided by valve seat 122 tends to close and the opening provided by valve seat 122' tends to open. This restricts the degree of pressure distribution to passage 62 while pressure distribution to passage 64 is increased. This results in an increase in the pressure in chamber 90 and a decrease in the pressure in chamber 86. This causes the piston 72 to shift in a left hand direction thereby causing a left turn maneuver.

If the valve element 126' is shifted in a right hand direction by the steering shaft, valve seat 122' tends to close and valve seat 122 tends to open. Thus, the pressure differential in chamber 86 and 90 is reversed and a power assist is obtained tending to facilitate a turning maneuver in a right hand direction.

When shaft 10 is turned clockwise, the pressure supply port in member 120' at low pressure in closed by valve element 126' as exhaust or outlet port for valve element 126 is still open. Since the sizes of the outlet ports in body 18 for valve elements 126 and 126' and the inlet ports in members 120 and 120' are equal, hydraulic pressure forces on the balls cancel each other at this time. Further clockwise motion of shaft 10 after closure of the right supply port causes the inlet valve seat for element 120' to travel to the right. Since the diameter of seal 128' is slightly larger than the port diameters, a slight hydraulic pressure resistance to continued motion of the shaft is felt by the operator.

The increased diameter of the seal provides some valve stability. It also ensures that the valve seat for element 120' will remain on the shoulder stop "A" until it is picked up by ball 126'. With continued motion to the right, valve element 126 gradually closes its outlet port, throttling the pump output, which is constant. A pressure increase is developed, which is directed to passage 62 while passage 64 is increasingly vented through the outlet port for element 126'. Finally the outlet port for element 126 closes to provide zero leakage. A slight additional motion of shaft 10 will cause it to mechanically drive valve body 18. For this purpose the shaft is formed with a key shape and a keyhole slot is formed in the body 18.

Valve stability is also enhanced by the flat valve contacting surface on shaft 10. Due to the geometry involved, the effective torque arm of the pressure force on element 126' becomes greater during clockwise movement than that of the force on element 126, producing a slight hydraulic torque resistance to clockwise rotation. This effect can be reduced to zero by using a cylindrical contour for the valve contacting surface on shaft 10. Other surface contours may be chosen for a partially reduced hydraulic torque resistance.

If the pressure source for the steering mechanism should fail for some reason, the steering worm shaft 30 can be actuated manually by reason of a mechanical connection provided between shaft 10 and the valve body 18 and between the valve body 18 and the lugs 36 on the worm shaft 30. Although the fully mechanical steering elements are characterized by a relatively degree of backlash, it is possible to maintain control of the vehicle without the power assist.

Figure 1B:
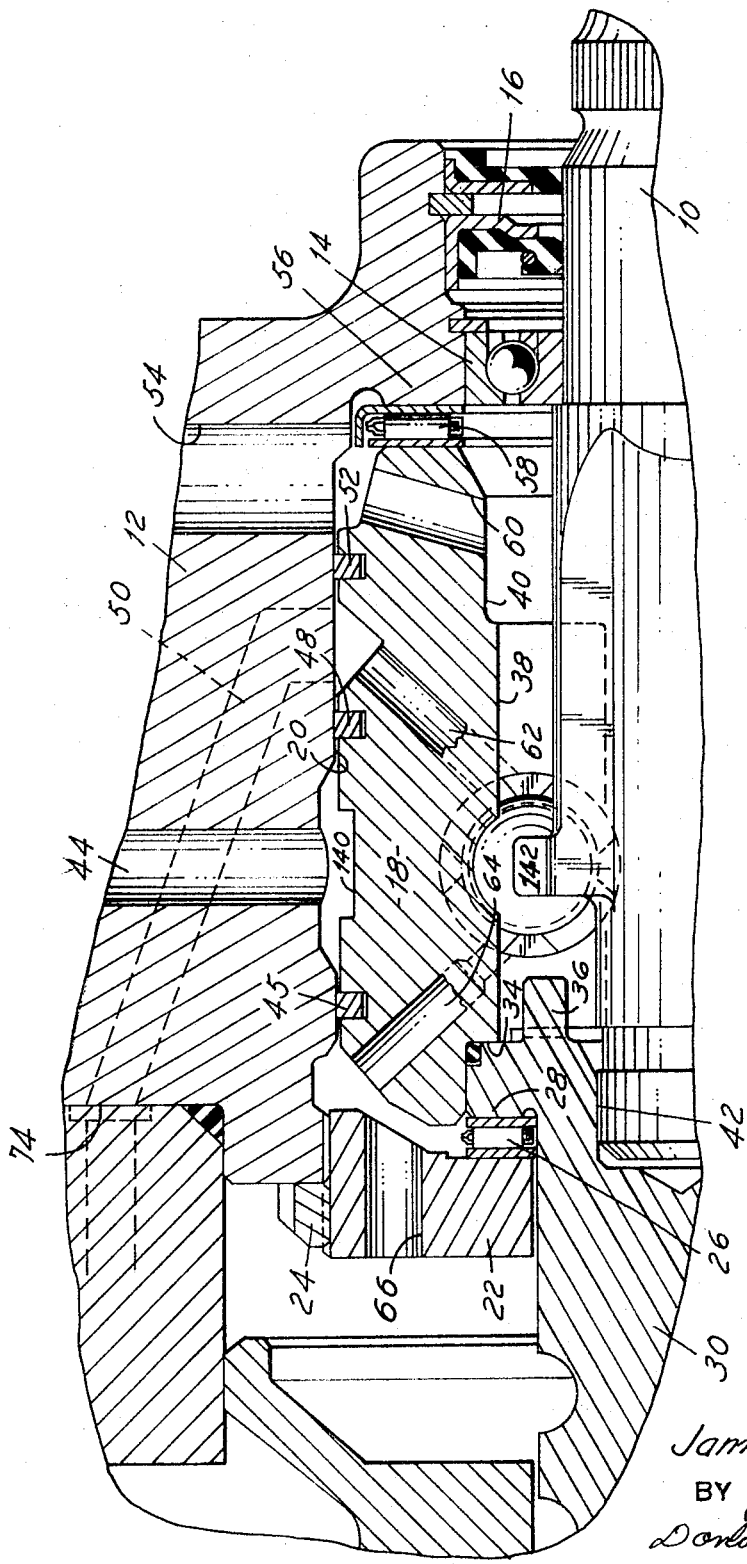
FIG. 1B is an enlargement of the valve structure of FIG. 1.
Figure 4:
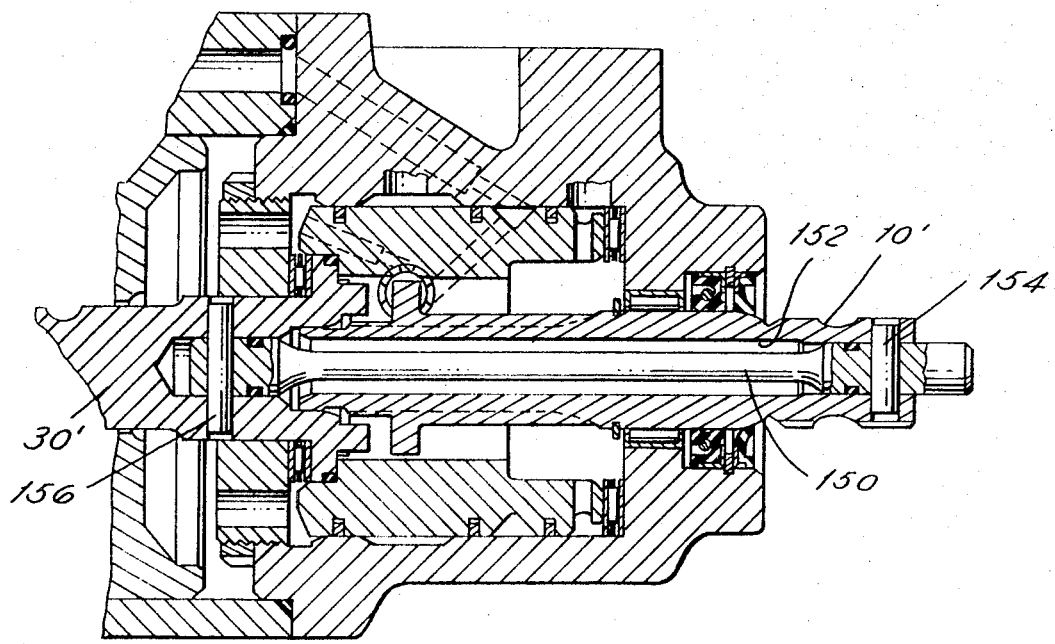
FIG. 4 shows an alternate construction including a torsion bar spring in the valve actuator mechanism rather than a C-spring as in the embodiment of FIG. 1, 2 and 3.

In FIG. 4 I have shown a mechanism similar to that described with reference to FIGS. 1, 2, and 3. Included in the FIG. 4 embodiment, however, is a torsion bar spring 150 which is positioned within central opening 152 formed in steering shaft 10'. One end of the torsion bar 150 is pinned as shown at 154 to provide a direct mechanical connection between the shaft 10' and the bar 150. The opposite end of the torsion bar 150 is pinned at 156 to the right hand end of the steering worm shaft 30'.

Application of torque to the shaft 10' is transmitted to the steering worm 30' through the torsion bar 150. This causes a deflection in the same manner that application of torque to the steering shaft 10 causes a deflection of the C-spring in the embodiment of FIG. 1, 2 and 3. The other elements of the FIG. 4 construction are the same as the corresponding elements of FIG. 1 both in function and in design. For this reason the elements of FIG. 4 have been indicated by similar reference characters although prime notations are added.

Having thus described the preferred forms of my invention, what I claim and desire to secure by U.S. Letters Patent is:

1. A steering mechanism for use in maintaining control of the dirigible wheels of a vehicle comprising a driving member, a fluid pressure cylinder, a piston mounted in said cylinder, a steering shaft, a connection between said driving member and said piston whereby rotary motion of said driving member effects reciprocating motion of said piston, a valve body, said steering shaft being mounted within said valve body, a driving connection between said valve body and said driving member, a pair of movable elements in said valve body, a valve seat registering with each valve element, said piston and cylinder cooperating to define a pair of opposed pressure chambers, a pressure inlet port, a first pressure passage extending from said inlet port to one pressure chamber and a second pressure passage extending from said inlet port to the other pressure chamber, each valve seat and its cooperating valve element defining one of said pressure passages, said valve elements being engageable with said steering shaft whereby the latter actuates said valve elements into and out of registry with respect to their valve seats thereby controlling the degree of pressure distribution from said pressure port to said pressure chambers, and spring means for providing a yieldable connection between said steering shaft and said valve body whereby deflection of said steering shaft with respect to said valve body during turning maneuvers is opposed by a yielding force of said spring means thereby introducing a steering force sensation, said spring means being a C-spring encircling said valve body, one end of said C-spring being engageable with one valve element and the other end of said C-spring being engageable with the other valve element thereby tending normally to urge said valve elements against said steering shaft to maintain the latter in a centered, pressure-balanced condition with respect to said valve body.

2. A steering mechanism for use in maintaining control of the dirigible wheels of a vehicle comprising a driving member, a fluid pressure cylinder, a piston mounted in said cylinder, a steering shaft, a connection between said driving member and said piston whereby rotary motion of said driving member effects reciprocating motion of said piston, a valve body, said steering shaft being mounted within said valve body, a driving connection between said valve body and said driving member, a pair of movable valve elements in said valve body, a valve seat registering with each valve element, said piston and cylinder cooperating to define a pair of opposed pressure chambers, a pressure inlet port, a first pressure passage extending from said inlet port to one pressure chamber and a second pressure passage extending from said inlet port to the other pressure chamber, each valve seat and its cooperating valve element defining one of said pressure passages, each valve element being adapted to be actuated by said steering shaft whereby said valve elements are moved into and out of registry with respect to their valve seats thereby controlling the degree of pressure distribution from said inlet port to said pressure chambers, each valve element being a ball engageable with said steering shaft, a circular valve member defining said valve seat surrounding each ball valve element and defining a valve seat adapted to register with said ball valve, the center of each circular valve member being in fluid communication with said pressure inlet port whereby fluid pressure is distributed from said inlet port through said valve seats to said pressure chambers.

3. A steering mechanism for use in maintaining control of the dirigible wheels of a vehicle comprising a driving member, a fluid pressure cylinder, a piston mounted in said cylinder, a steering shaft, a connection between said driving member and said piston whereby rotary motion of said driving member effects reciprocating motion of said piston, a valve body, said steering shaft being mounted within said valve body, a driving connection between said valve body and said driving member, a pair of movable valve elements in said valve body, a valve seat registering with each valve element, said piston and cylinder cooperating to define a pair of opposed pressure chambers, a pressure inlet port, a first pressure passage extending from said inlet port to one pressure chamber and a second pressure passage extending from said inlet port to the other pressure chamber, each valve seat and its cooperating valve element defining one of said pressure passages, said valve elements being engageable with said steering shaft whereby the latter actuates said valve elements into and out of registry with respect to their valve seats thereby controlling the degree of pressure distribution from said pressure port to said pressure chambers, and spring means for providing a yieldable connection between said steering shaft and said valve body whereby deflection of said steering shaft with respect to said valve body during turning maneuvers is opposed by a yielding force of said spring means thereby introducing a steering force sensation, each valve element being a ball engageable with said steering shaft, a circular valve member defining said valve seat surrounding each ball valve element and defining a valve seat adapted to register with said ball valve, the center of each circular valve member being in fluid communication with said pressure inlet port whereby fluid pressure is distributed from said inlet port through said valve seats to said pressure chambers.

4. The combination set forth in claim 1 wherein each valve element is a ball engageable with said steering shaft, an circular valve member defining said valve member surrounding each ball valve element and defining a valve seat adapted to register with said ball valve, the center of each circular valve member being in fluid communication with said pressure inlet port whereby fluid pressure is distributed from said inlet port through said valve seats to said pressure chambers.

5. The combination set forth in claim 2 wherein said circular valve member is adapted to be adjusted under the influence of fluid pressure in a direction transverse to the axis of said steering shaft, and means for limiting the degree of adjustment to provide a normally open valve seat permitting fluid circulation through said valve members when said steering shaft is centered with respect to said valve body.

6. The combination set forth in claim 3 wherein said circular valve member is adapted to be adjusted under the influence of fluid pressure in a direction transverse to the axis of said steering shaft, and means for limiting the degree of adjustment to provide a normally open valve seat permitting fluid circulation through said valve members when said steering shaft is centered with respect to said valve body.

7. The combination set forth in claim 4 wherein said circular valve member is adapted to be adjusted under the influence of fluid pressure in a direction transverse to the axis of said steering shaft, and means for limiting the degree of adjustment to provide a normally open valve seat permitting fluid circulation through said valve members when said steering shaft is centered with respect to said valve body.

* * * * *